United States Patent
Wang et al.

(10) Patent No.: US 12,202,179 B2
(45) Date of Patent: Jan. 21, 2025

(54) SUPERCRITICAL FLUID INJECTION FOAMING POLYLACTIDE FOAM MATERIAL AND PREPARATION METHOD THEREFOR

(71) Applicant: NINGBO INSTITUTE OF MATERIALS TECHNOLOGY AND ENGINEERING, CHINESE ACADEMY OF SCIENCES, Ningbo (CN)

(72) Inventors: Long Wang, Ningbo (CN); Wenge Zheng, Ningbo (CN); Qian Ren, Ningbo (CN); Lihua Zhang, Ningbo (CN); Minghui Wu, Ningbo (CN); Fei Wu, Ningbo (CN); Haibin Luo, Ningbo (CN)

(73) Assignee: NINGBO INSTITUTE OF MATERIALS TECHNOLOGY AND ENGINEERING, CHINESE ACADEMY OF SCIENCES, Ningbo (CN)

( * ) Notice: Subject to any disclaimer, the term of this patent is extended or adjusted under 35 U.S.C. 154(b) by 337 days.

(21) Appl. No.: 17/795,538

(22) PCT Filed: Sep. 11, 2020

(86) PCT No.: PCT/CN2020/114854
§ 371 (c)(1),
(2) Date: Jul. 27, 2022

(87) PCT Pub. No.: WO2021/159705
PCT Pub. Date: Aug. 19, 2021

(65) Prior Publication Data
US 2023/0054285 A1    Feb. 23, 2023

(30) Foreign Application Priority Data
Feb. 11, 2020   (CN) .......................... 202010086835.9

(51) Int. Cl.
*B29C 44/42*   (2006.01)
*B29B 7/20*    (2006.01)
(Continued)

(52) U.S. Cl.
CPC ............... *B29C 44/42* (2013.01); *B29B 7/20* (2013.01); *B29B 7/90* (2013.01); *B32B 5/18* (2013.01);
(Continued)

(58) Field of Classification Search
None
See application file for complete search history.

(56) References Cited

U.S. PATENT DOCUMENTS

| 5,334,356 A * | 8/1994 | Baldwin | B29C 44/3446 |
| | | | 422/138 |
| 12,043,717 B2 * | 7/2024 | Kumai | C08K 3/36 |

(Continued)

FOREIGN PATENT DOCUMENTS

| CN | 102618001 A | 8/2012 |
| CN | 103772751 A | 5/2014 |

(Continued)

OTHER PUBLICATIONS

M. Sauceau et al. "New challenges in polymer foaming: A review of extrusion processes assisted by supercritical carbon dioxide." Progress in Polymer Science, 2011, 36, pp. 749-766. (Year: 2011).*

(Continued)

*Primary Examiner* — Vivian Chen

(57) ABSTRACT

The present application relates to a supercritical fluid injection foaming polylactide foam material and a preparation method therefor. The method includes: first obtaining a surface-modified cellulose nanofiber aqueous solution; then melting and blending the cellulose nanofiber aqueous solution and a polylactide twice; passing same through extru- (Continued)

sion, cooling under water, and granulation so as to obtain a polylactide/cellulose nanofiber composite material; then plasticizing and melting the polylactide/cellulose nanofiber composite material in a microporous foaming injection molding machine; uniformly mixing same with a supercritical fluid foaming agent in the injection molding machine; injecting same into a mold cavity; and subjecting the resultant to post-treatment so as to obtain a polylactide foam material. The polylactide foam material has a sandwich structure, in which two outer surface layers are solid layers that do not contain any foam, and the sandwiched layer is a foam layer having a cellular structure.

10 Claims, 1 Drawing Sheet

(51) Int. Cl.
| | |
|---|---|
| B29B 7/48 | (2006.01) |
| B29B 7/60 | (2006.01) |
| B29B 7/74 | (2006.01) |
| B29B 7/84 | (2006.01) |
| B29B 7/90 | (2006.01) |
| B29B 7/92 | (2006.01) |
| B29B 7/94 | (2006.01) |
| B29C 44/34 | (2006.01) |
| B29K 67/00 | (2006.01) |
| B29K 201/00 | (2006.01) |
| B32B 5/18 | (2006.01) |
| C08J 5/06 | (2006.01) |
| C08J 9/00 | (2006.01) |
| C08J 9/12 | (2006.01) |
| D21H 11/20 | (2006.01) |

(52) U.S. Cl.
CPC .............. *C08J 5/06* (2013.01); *C08J 9/0061* (2013.01); *C08J 9/122* (2013.01); *B29B 7/48* (2013.01); *B29B 7/603* (2013.01); *B29B 7/7404* (2013.01); *B29B 7/84* (2013.01); *B29B 7/845* (2013.01); *B29B 7/847* (2013.01); *B29B 7/92* (2013.01); *B29B 7/94* (2013.01); *B29C 44/3442* (2013.01); *B29C 44/3446* (2013.01); *B29K 2067/046* (2013.01); *B29K 2201/00* (2013.01); *B32B 2250/40* (2013.01); *B32B 2266/0264* (2013.01); *B32B 2307/54* (2013.01); *B32B 2307/72* (2013.01); *C08J 9/0071* (2013.01); *C08J 9/0076* (2013.01); *C08J 9/0085* (2013.01); *C08J 9/009* (2013.01); *C08J 2201/03* (2013.01); *C08J 2203/06* (2013.01); *C08J 2203/08* (2013.01); *C08J 2205/044* (2013.01); *C08J 2367/04* (2013.01); *C08J 2401/02* (2013.01); *D21H 11/20* (2013.01)

(56) References Cited

U.S. PATENT DOCUMENTS

| | | | | |
|---|---|---|---|---|
| 2010/0056656 | A1* | 3/2010 | Matsuoka | C08L 67/04 524/81 |
| 2012/0181729 | A1* | 7/2012 | Turng | B29C 45/17 264/328.17 |
| 2016/0186382 | A1* | 6/2016 | Nikkilä | D21F 5/00 162/146 |
| 2019/0344486 | A1* | 11/2019 | Ichiki | B29C 44/422 |
| 2021/0221965 | A1* | 7/2021 | Gneuss | B29B 7/845 |
| 2021/0222006 | A1* | 7/2021 | Ono | D21H 11/20 |
| 2022/0088840 | A1* | 3/2022 | Huang | B29C 48/92 |
| 2022/0097274 | A1* | 3/2022 | Song | C08K 5/098 |
| 2022/0111570 | A1* | 4/2022 | Waggoner | B29C 44/348 |

FOREIGN PATENT DOCUMENTS

| | | | |
|---|---|---|---|
| CN | 104629077 A | | 5/2015 |
| CN | 107383434 A | | 11/2017 |
| CN | 107915860 A | | 4/2018 |
| CN | 109501107 A | | 3/2019 |
| WO | WO 2019-150907 A | * | 8/2019 |
| WO | WO 2020-050286 A | * | 3/2020 |

OTHER PUBLICATIONS

M. Chauvet et al. "Extrusion assisted by supercritical CO2: A review on its application to biopolymers." Journal of Supercritical Fluids, 2017, Special Issue—11th International Symposiumon. Supercritical Fluids, 120(Part2), pp. 408-420. (Year: 2017).*
Chen, Dan. "Preparation and Supercritical CO2 Foaming of Modified NCC/PLA Composites", Chinese Master's Theses Full-Text Database (Engineering Science and Technology I), Oct. 31, 2015, pp. B016-B096, sections 2.2.2, 3.2.2 and 4.2.2.
Shi, Xiaoyao. "The Study of Poly (Lactic Acid)Reinforced with Cellulose", Chinese Master's Theses Full-Text Database (Engineering Science and Technology I), Jul. 31, 2017, pp. B020-B071, sections 2.2.2, 3.2.2 and 4.2.2.2.
Dai, Lu. "Preparation and Properties of the Microcellular Foamed Microcrystalline Cellulose/Polylactide Composites", Chinese Master's Theses Full-Text Database (Engineering Science and Technology I), Jan. 31, 2020, pp. B020-B0319, section 3.3.
Qiu, Yaxin et al. "Cyclic tensile properties of the polylactide nanocomposite foams containing cellulose nanocrystals", Cellulose, Feb. 7, 2018, vol. 25, No. 3, pp. 1795-1807.
Cho, Se Youn et al. "Influence of cellulose nanofibers on the morphology and physical properties of poly(lactic acid) foaming by supercritical carbon dioxide", Macromolecular Research, May 31, 2013, vol. 21, No. 5, pp. 529-533.
Dlouha, Jana et al. "The role of cellulose nanofibres in supercritical foaming of polylactic acid and their effect on the foammorphology", Soft Matter, Dec. 31, 2012, vol. 8, No. 33, pp. 8704-8713.
Dlouha, Jana et al. "Cellulose nanofibre-poly (lactic acid) microcellular foams exhibiting high tensile toughness", Reactive & Functional Polymers, Jul. 21, 2014, vol. 85, pp. 201-207.
Ding, Wei Dan et al. "Development of PLA/cellulosic fiber composite foams using injection molding: Crystallization and foaming behaviors", Composites Part A—Applied Science and Manufacturing, Oct. 24, 2015, vol. 83, pp. 130-139.
East China Textile Institute. "Raw Material of Acetyl Cellulose", Processing Technology of Chemical Fibers, May 31, 1962, pp. 251-255.
China Office Action of 202010086835.9, Mar. 23, 2021.
International Search Report of PCT/CN2020/114854, Nov. 20, 2020.

* cited by examiner

SUPERCRITICAL FLUID INJECTION FOAMING POLYLACTIDE FOAM MATERIAL AND PREPARATION METHOD THEREFOR

CROSS-REFERENCE TO RELATED APPLICATION

This application is a National stage application of international PCT patent application PCT/CN2020/114854 filed on Sep. 11, 2020, which claims all benefits accruing under 35 U.S.C. § 371 from China Patent Application No. 202010086835.9, filed on Feb. 11, 2020, and titled "SUPERCRITICAL FLUID INJECTION FOAMING POLYLACTIDE FOAM MATERIAL AND PREPARATION METHOD THEREFOR", in the China National Intellectual Property Administration, the contents of both are hereby incorporated by reference.

TECHNICAL FIELD

The present disclosure relates to macromolecular materials, in particular to a supercritical fluid injection foaming polylactide foam material and a method for preparing the same.

BACKGROUND

Polylactide (PLA) is a kind of thermoplastic aliphatic polyester, which has good mechanical performance, processability, transparency and unique barrier performance PLA is normally prepared by ring opening polymerization of lactide, and sourced from starch and saccharides of renewable resources such as wheat, corn, cereals, rice straw, and the like. Since the PLA can be completely biologically degraded to carbon dioxide and water after use, and will not pollute the environment, the PLA is an attractive green and environmentally friendly material, and is expected to replace conventional petroleum base plastics and be widely used in each fields. Nowadays, polylactide foaming materials has become a hotspot in the field of foaming material research. The PLA is hopeful to be widely used in fields such as daily necessities and packaging to replace conventional petroleum base foamed plastics, so as to solve the problem of "white pollution".

However, a molecular chain of the PLA is semi-rigid, so that the PLA has low melt strength, slow crystallization rate and poor foamability. Thus, the PLA is generally modified before a foaming process. Currently, foamability of the PLA can be enhanced by the following three methods: a first method is adding another polymer into the PLA to generate a copolymer mixture, and adding a second component can enhance the foamability of the PLA to some extent; a second method is changing chain structure of the PLA molecule, such as adding a chain extender or a cross-linking agent in to the PLA for cross-linking; and a third method is adding additives into the PLA, which is an effective way to enhance foamability of the PLA, and adding the additives can increase mechanical performance of the PLA foam material, but adding biological based additives will influence biological natures of the PLA materials and decrease biodegradability of the PLA material.

Currently, foaming agents used for preparing the PLA foam materials are generally conventional chemical foaming agents or conventional physical foaming agents, such as alkane foaming agent. The PLA foam materials prepared by the conventional foaming agents have large porous sizes, and poor mechanical performances. In addition, in conventional art, batch-type foaming process is generally applied, which is difficult to be applied in large-scale industrialization.

SUMMARY

The present disclosure provides a method for preparing a polylactide foam material by a supercritical fluid injection foaming method, including,
(1) adding dry cellulose pulp into an organic solvent and stirring at room temperature to obtain a modified cellulose nanofiber paste, successively washing the modified cellulose nanofiber paste with alcohol and deionized water to obtain a surface-modified cellulose nanofiber aqueous solution;
(2) adding a polylactide into a twin-screw extruder via a main feed inlet of the twin-screw extruder, and adding the surface-modified cellulose nanofiber aqueous solution into the twin-screw extruder via an additive feed inlet of the twin-screw extruder, mixing, melting, and extruding the polylactide and the surface-modified cellulose nanofiber firstly, to obtain a first extrudate, while removing vapor via a vent disposed on a charging barrel of the twin-screw extruder,
melting, mixing, and extruding the first extrudate secondly via the twin-screw extruder to obtain a mixture, extruding the mixture to obtain a second extrudate, cooling the second extrudate in water, and dicing to obtain a polylactide/cellulose nanofiber composite;
(3) disposing the polylactide/cellulose nanofiber composite in a microporous foaming injection molding machine to plastify and melt the polylactide/cellulose nanofiber composite, and injecting a supercritical foaming agent into the microporous foaming injection molding machine with a supercritical fluid equipment to obtain a homogeneous polymer/gas-mixed polymer melt; and
(4) injecting the polymer/gas-mixed polymer melt into a cavity of a die, maintaining a pressure in the die, opening the die, and foaming the polymer/gas-mixed polymer melt, and cooling and molding to obtain a polylactide foam material.

In the method for preparing the polylactide foam material by the supercritical fluid injection foaming method of the present disclosure, a biological additive cellulose nanofiber (CNF) is added into the polylactide to prepare a modified light high-strength polylactide foam material. In one aspect, the CNF can form an additive network in the PLA to improve strength of a PLA melt; and in another aspect, the CNF can also play a role as a nucleating agent of PLA crystallization to facilitate crystallization of PLA. Thereafter, the cellulose nanofiber modified polylactide composite and a supercritical foaming agent are mixed evenly in an injection molding machine, and microporous injection molding technology and a die-opening and closing foaming equipment are applied to obtain a wholly bio-based polylactide foam material prepared by the microporous injection molding technology. Porous size, cell density, expansion ratio, and mechanical ratio of the wholly bio-based polylactide foam material can be accurately adjusted. The method has high production efficiency and can be widely used.

In some embodiments, the organic solvent is a mixed liquid of toluene, acetic acid, perchloric acid and acetic anhydride, wherein a volume ratio of toluene, acetic acid, perchloric acid and acetic anhydride is 100:80:(0.2-1.2):(1-

10). A mass percentage of the cellulose nanofiber in the modified cellulose nanofiber paste is in a range of 5% to 40%. A diameter of the cellulose nanofiber is in a range of 5 nm to 50 nm, and a length-diameter ratio of the cellulose nanofiber is in a range of 100 to 1000. A duration of stirring at room temperature is in a range of 1 hour to 5 hours.

In some embodiments, in step (1), the cellulose is one selected from ramie fiber, flax fiber, sisal fiber, jute fiber, hemp fiber, or bamboo fiber. In step (2), the polylactide is L-polylactic acid and/or D-polylactic acid, and a weight-average molecular weight of the polylactide is in a range of 100000 to 400000.

In some embodiments, a mass percentage of the cellulose nanofiber in the polylactide/cellulose nanofiber composite is in a range of 1% to 20%.

In some embodiments, in step (2), a barrel temperature of mixing and melting the polylactide and the surface-modified cellulose nanofiber is in a range of 93 degrees centigrade to 99 degrees centigrade, and a screw speed of mixing and melting the polylactide and the surface-modified cellulose nanofiber is in a range of 100 rpm to 200 rpm. A barrel temperature of melting and mixing the first extrudate is in a range of 140 degrees centigrade to 180 degrees centigrade, and a screw speed of melting and mixing the first extrudate is in a range of 100 rpm to 200 rpm.

In some embodiments, the supercritical foaming agent is selected from the group consisting of supercritical carbon dioxide, supercritical nitrogen, and any combination thereof.

In some embodiments, the supercritical foaming agent is the supercritical carbon dioxide, and a mass percentage of the supercritical carbon dioxide in the polymer/gas-mixed polymer melt is in a range of 3% to 8%. In some embodiments, the supercritical foaming agent is the supercritical nitrogen, and a mass percentage of the supercritical nitrogen in the polymer/gas-mixed polymer melt is in a range of 0.2% to 0.8%.

In some embodiments, in step (3), a pressure of the supercritical foaming agent is in a range of 18 MPa to 30 MPa, and a screw temperature of the microporous foaming injection molding machine is in a range of 160 degrees centigrade to 240 degrees centigrade.

In some embodiments, in step (4), an injection rate of the polymer/gas-mixed polymer melt is in a range of 1 mm/s to 300 mm/s, a temperature of the die is in a range of 40 degrees centigrade to 90 degrees centigrade, the pressure in the die is maintained in a range of 5 MPa to 100 MPa, and a duration of maintaining the pressure in the die is in a range of 0.2 seconds to 10 seconds. A speed of opening the die is in a range of 10 mm/s to 30 mm/s, an expansion ratio of the polymer/gas-mixed polymer melt is in a range of 2 times to 20 times, and a duration of cooling is in a range of 5 seconds to 300 seconds.

A polylactide foam material prepared by the method above, wherein the polylactide foam material is in a sandwich-shaped structure, which includes two outer surface layers and a sandwiched layer. The two outer surface layers are solid layers without any foam, and the sandwiched layer is a foam layer including porous structures. A density of the polylactide foam material is in a range of 0.05 $g/cm^3$ to 0.7 $g/cm^3$, and a maximum tensile strength of the polylactide foam material is 60 MPa, and a maximum Young's modulus of the polylactide foam material is 2.2 GPa.

The polylactide foam materials prepared by the method of the present disclosure have uniform porous sizes, high cell density and good performances, and can be used in fields such as vehicle, rail transit, communication electronics, building insulation, packaging and transportation, aerospace, and the like.

BRIEF DESCRIPTION OF THE DRAWINGS

In order to better describe and explain the embodiments and/or examples of those inventions disclosed herein, one or more drawings may be referred to. The additional details or examples used to describe the drawings should not be considered as limiting the scope of any of the disclosed inventions, the currently described embodiments and/or examples, and the best mode of these inventions currently understood.

DETAILED DESCRIPTION

Figure 1:
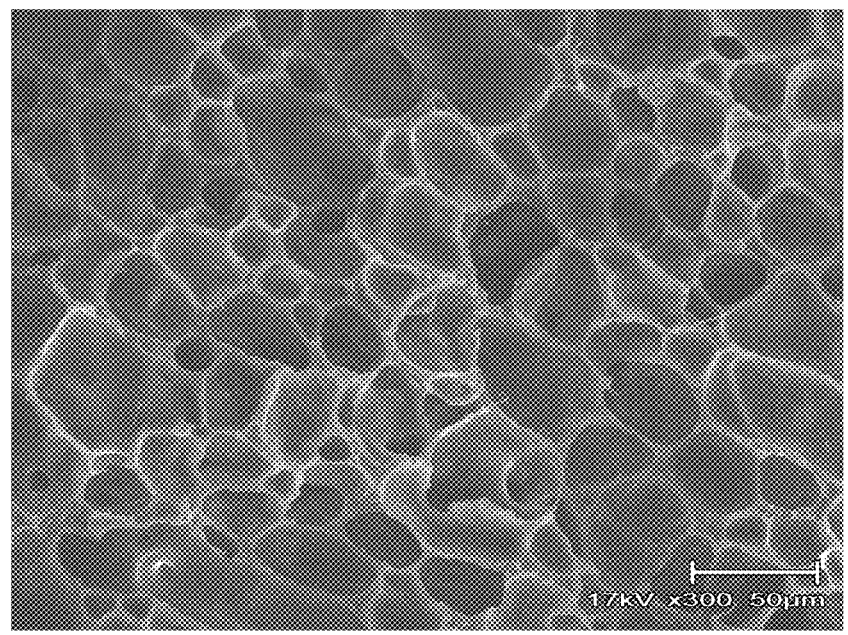
FIG. 1 is a scanning electron microscope photo (SEM) of a polylactide foam material prepared in embodiment 2.

A supercritical fluid injection foaming polylactide foam material and a method for preparing the same will be described in details hereinafter.

The present disclosure provides a method for preparing a polylactide foam material by a supercritical fluid injection foaming method, including, (1) adding dry cellulose pulp into an organic solvent and stirring at room temperature to obtain a modified cellulose nanofiber paste, successively washing the modified cellulose nanofiber paste with alcohol and deionized water to obtain a surface-modified cellulose nanofiber aqueous solution;

(2) adding a polylactide into a twin-screw extruder via a main feed inlet of the twin-screw extruder, and adding the surface-modified cellulose nanofiber aqueous solution into the twin-screw extruder via an additive feed inlet of the twin-screw extruder, mixing, melting, and extruding the polylactide and the surface-modified cellulose nanofiber firstly, to obtain a first extrudate, while removing vapor via a vent disposed on a charging barrel of the twin-screw extruder, melting, mixing, and extruding the first extrudate secondly via the twin-screw extruder to obtain a mixture, extruding the mixture to obtain a second extrudate, cooling the second extrudate in water, and dicing to obtain a polylactide/cellulose nanofiber composite;

(3) disposing the polylactide/cellulose nanofiber composite in a microporous foaming injection molding machine to plastify and melt the polylactide/cellulose nanofiber composite, and injecting a supercritical foaming agent into the microporous foaming injection molding machine with a supercritical fluid equipment to obtain a homogeneous polymer/gas-mixed polymer melt; and (4) injecting the polymer/gas-mixed polymer melt into a cavity of a die, maintaining a pressure in the die, opening the die, and foaming the polymer/gas-mixed polymer melt, and cooling and molding to obtain a polylactide foam material.

In step (1), the organic solvent can be a mixed liquid of toluene, acetic acid, perchloric acid and acetic anhydride, wherein a volume ratio of toluene, acetic acid, perchloric acid and acetic anhydride is 100:80:(0.2-1.2):(1-10). Therefore, an acetylate-modified cellulose can be obtained, and the acetylate-modified cellulose can disperse in the polylactide more evenly.

In some embodiments, a mass percentage of the cellulose nanofiber in the modified cellulose nanofiber paste is in a range of 5% to 40%, and a duration of stirring at room temperature is in a range of 1 hour to 5 hours.

In some embodiments, a diameter of the cellulose nanofiber is in a range of 5 nm to 50 nm, and a length-diameter ratio of the cellulose nanofiber is in a range of 100 to 1000. Compared with cellulose nanocrystalline (having a length-diameter ratio in a range of 1 to 20), the cellulose nanofiber has advantages such as greater length-diameter ratio, higher superficial area, and more easily to intertwine and form a network, so as to facilitate improving strength of a polymer material and performances of a melt.

In some embodiments, the cellulose is one selected from ramie fiber, flax fiber, sisal fiber, jute fiber, hemp fiber, or bamboo fiber.

Since PLA melt has a low strength, it is easy to generate large holes and nonuniform holes in a foaming process. Therefore, in step (2) of the present disclosure, cellulose nanofiber (CNF) can be added in to the PLA melt as a nanometer level additive. Adding the CNF can provide a heterogeneous nucleation for the PLA to facilitate crystallization of PLA, thereby improving a number of the holes and a cell density of the holes and modifying porous structures. Meanwhile, adding the CNF can generate an additive network in the PLA, so as to improve strength of the PLA melt.

In some embodiments, the polylactide is L-polylactic acid and/or D-polylactic acid, and a weight-average molecular weight of the polylactide is in a range of 100000 to 400000. A mass percentage of the cellulose nanofiber in the polylactide/cellulose nanofiber composite is in a range of 1% to 20%.

In step (2), after mixing and melting the polylactide and the surface-modified cellulose nanofiber, water in the cellulose nanofiber can be removed, so that the cellulose nanofiber can be dispersed in the polylactide. Then, after melting and mixing the first extrudate, the cellulose is mechanically exfoliated by a high shearing force of the screw, so as to obtain a cellulose nanofiber-containing polylactide/cellulose nanofiber composite.

In some embodiments, a barrel temperature of mixing and melting the polylactide and the surface-modified cellulose nanofiber is in a range of 93 degrees centigrade to 99 degrees centigrade, and a screw speed of mixing and melting the polylactide and the surface-modified cellulose nanofiber is in a range of 100 rpm to 200 rpm. A barrel temperature of melting and mixing the first extrudate is in a range of 140 degrees centigrade to 180 degrees centigrade, and a screw speed of melting and mixing the first extrudate is in a range of 100 rpm to 200 rpm.

In step (3), the supercritical foaming agent is selected from the group consisting of supercritical carbon dioxide, supercritical nitrogen, and any combination thereof. In some embodiments, the supercritical foaming agent is the supercritical carbon dioxide, and a mass percentage of the supercritical carbon dioxide in the polymer/gas-mixed polymer melt is in a range of 3% to 8%. In some embodiments, the supercritical foaming agent is the supercritical nitrogen, and a mass percentage of the supercritical nitrogen in the polymer/gas-mixed polymer melt is in a range of 0.2% to 0.8%. Furthermore, a pressure of the supercritical foaming agent is in a range of 18 MPa to 30 MPa. In some embodiments, the pressure of the supercritical foaming agent is in a range of 20 MPa to 28 MPa. A screw temperature of the microporous foaming injection molding machine is in a range of 160 degrees centigrade to 240 degrees centigrade. In some embodiments, the screw temperature of the microporous foaming injection molding machine is in a range of 180 degrees centigrade to 220 degrees centigrade.

In step (4), an injection rate of the polymer/gas-mixed polymer melt is in a range of 1 mm/s to 300 mm/s. In some embodiments, the injection rate of the polymer/gas-mixed polymer melt is in a range of 70 mm/s to 150 mm/s. In some embodiments, a temperature of the die is in a range of 40 degrees centigrade to 90 degrees centigrade. In some embodiments, the temperature of the die is in a range of 40 degrees centigrade to 70 degrees centigrade. In some embodiments, the pressure in the die is maintained in a range of 5 MPa to 100 MPa. In some embodiments, the pressure in the die is maintained in a range of 20 MPa to 60 MPa. In some embodiments, a duration of maintaining the pressure in the die is in a range of 0.2 seconds to 10 seconds. In some embodiments, the duration of maintaining the pressure in the die is in a range of 3 seconds to 7 seconds. A duration of cooling is in a range of 5 seconds to 300 seconds. In some embodiments, the duration of cooling is in a range of 40 seconds to 110 seconds. In some embodiments, a speed of opening the die is in a range of 10 mm/s to 30 mm/s. In some embodiments, an expansion ratio of the polymer/gas-mixed polymer melt is in a range of 2 times to 20 times.

In the present disclosure, a microporous foaming injection technology is applied, so that step (3) and step (4) can be continuously completed in a microporous foaming injection molding machine. Time consumption of method in the present disclosure is short, and a high-performance foaming material can be obtained in several minutes or even dozens of seconds.

The present disclosure further provides a polylactide foam material prepared by the method of the present disclosure. The polylactide foam material is a wholly bio-based foam material having a sandwich-shaped structure which includes two outer surface layers and a sandwiched layer. The two outer surface layers are solid layers without any foam, and the sandwiched layer is a foam layer including porous structures. A density of the light high-strength polylactide foam material is in a range of 0.05 g/cm$^3$ to 0.7 g/cm$^3$, and a maximum tensile strength of the polylactide foam material is 60 MPa, and a maximum Young's modulus of the polylactide foam material is 2.2 GPa. The polylactide foam materials prepared by the method of the present disclosure have uniform porous sizes, high cell density and good performances, and can be used in fields such as vehicle, rail transit, communication electronics, building insulation, packaging and transportation, aerospace, and the like.

The supercritical fluid injection foaming polylactide foam material and the method for preparing the same will be further described in details in conjunction with embodiments hereinafter.

In the present disclosure, a flow curve, cell density and porous size can be tested by the following methods.

Flow curve: an AR2000EX strain control rheometer, a fixture of the rheometer was a 25 mm panel fixture. A test distance was 1.0 mm, and the test was carried out under a strain control mode. In order to ensure that the rheological properties of all material samples were measured in the linear viscoelastic region, the dependent variable was controlled to be 1.0%, and the dynamic frequency sweep test was carried out at a temperature of 180 degrees centigrade.

Foam density: a foam density of foam material was measured according to a drainage method in GB/T6343-2009 standard.

Porous size: the microporous foam material is quenched by liquid nitrogen, and a cross section of the foam material is sprayed with gold, then the foam material is observed with a scanning electron microscope (SEM) to observe the cell structure inside the foam material. Porous size and cell density were measured with Image J software.

In the present disclosure, injection molding machine (microporous foaming injection molding machine) having 180 tons of clamping force of Japan Steel Works (JSW) and the MuCell pressurized equipment developed by U.S. Trexel company were used to prepare the microporous foam injection molding products.

Embodiment 1

(1) A dry cellulose pulp was added into a mixed liquid of toluene, acetic acid, perchloric acid and acetic anhydride, wherein a volume ratio of toluene, acetic acid, perchloric acid and acetic anhydride was 100:80:0.2:1. A mass percentage of cellulose nanofiber was 5%. The resultant was stirred at room temperature for 1 hour to obtain a modified cellulose nanofiber paste. Then, the modified cellulose nanofiber paste was successively washed with alcohol and deionized water to obtain a surface-modified cellulose nanofiber aqueous solution.

(2) A PLA having a weight-average molecular weight of 400000 was added into a twin-screw extruder via a main feed inlet of the twin-screw extruder, and the surface-modified cellulose nanofiber aqueous solution was added into the twin-screw extruder via an additive feed inlet of the twin-screw extruder. The polylactide and the surface-modified cellulose nanofiber aqueous solution were mixed and melt by a high shearing force of the screw, and extruded firstly to obtain a first extrudate, and vapor was removed from a vent disposed on a charging barrel of the twin-screw extruder. The first extrudate was mixed and melt secondly to obtain a mixture, and the mixture was extruded secondly to obtain a second extrudate. A barrel temperature of mixing and melting the polylactide and the surface-modified cellulose nanofiber was 99 degrees centigrade, screw speed of mixing and melting the polylactide and the surface-modified cellulose nanofiber was 100 rpm. A barrel temperature of melting and mixing the first extrudate was 140 degrees centigrade, and a screw speed of melting and mixing the first extrudate was 140 rpm. The second extrudate was cooled in water, and diced to obtain a polylactide/cellulose nanofiber (PLA/CNF) composite, wherein a mass percentage of the cellulose nanofiber in the polylactide/cellulose nanofiber (PLA/CNF) composite was 1%.

(3) The PLA/CNF composite was disposed in a microporous foaming injection molding machine to plastify and melt the polylactide/cellulose nanofiber composite to obtain a polymer melt. A temperature for melting the PLA/CNF composite was 180 degrees centigrade. A supercritical nitrogen was injected into the microporous foaming injection molding machine with a supercritical fluid equipment, and dispersed and mixed in the polymer melt to obtain a homogeneous polymer/gas-mixed polymer melt. A pressure of the supercritical nitrogen was 20 MPa, and a weight percentage of the supercritical nitrogen in the polymer melt was 0.2 wt %.

(4) The polymer/gas-mixed polymer melt was injected into a cavity of a die from a nozzle with the help of the injection molding machine screw. An injection rate of the polymer/gas-mixed polymer melt was 70 mm/s. A temperature of the die is in a range of 40 degrees centigrade. The pressure in the die was maintained at 20 MPa. After maintaining the pressure for 3 seconds, a movable side of the die was rapidly opened at a speed of 10 mm/s to start a foaming process. An expansion ratio of the polymer/gas-mixed polymer melt was defined as 2 times. After the foaming process, the product was cooled for 40 seconds, pushed out from the die to obtain a cellulose nanofiber-modified polylactide foam material.

Embodiment 2

(1) A dry cellulose pulp was added into a mixed liquid of toluene, acetic acid, perchloric acid and acetic anhydride, wherein a volume ratio of toluene, acetic acid, perchloric acid and acetic anhydride was 100:80:0.4:3. A mass percentage of cellulose nanofiber was 10% The resultant was stirred at room temperature for 2 hours to obtain a modified cellulose nanofiber paste. Then, the modified cellulose nanofiber paste was successively washed with alcohol and deionized water to obtain a surface-modified cellulose nanofiber aqueous solution.

(2) A PLA having a weight-average molecular weight of 250000 was added into a twin-screw extruder via a main feed inlet of the twin-screw extruder, and the surface-modified cellulose nanofiber aqueous solution was added into the twin-screw extruder via an additive feed inlet of the twin-screw extruder. The polylactide and the surface-modified cellulose nanofiber aqueous solution were mixed and melt by a high shearing force of the screw, and extruded firstly to obtain a first extrudate, and vapor was removed from a vent disposed on a charging barrel of the twin-screw extruder. The first extrudate was mixed and melt secondly to obtain a mixture, and the mixture was extruded secondly to obtain a second extrudate. A barrel temperature of mixing and melting the polylactide and the surface-modified cellulose nanofiber was 97 degrees centigrade, screw speed of mixing and melting the polylactide and the surface-modified cellulose nanofiber was 130 rpm. A barrel temperature of melting and mixing the first extrudate was 150 degrees centigrade, and a screw speed of melting and mixing the first extrudate was 150 rpm. The second extrudate was cooled in water, and diced to obtain a polylactide/cellulose nanofiber (PLA/CNF) composite, wherein a mass percentage of the cellulose nanofiber in the polylactide/cellulose nanofiber (PLA/CNF) composite was 5%.

(3) The PLA/CNF composite was disposed in a microporous foaming injection molding machine to plastify and melt the polylactide/cellulose nanofiber composite to obtain a polymer melt. A temperature for melting the PLA/CNF composite was 190 degrees centigrade. A supercritical nitrogen was injected into the microporous foaming injection molding machine with a supercritical fluid equipment, and dispersed and mixed in the polymer melt to obtain a homogeneous polymer/gas-mixed polymer melt. A pressure of the supercritical nitrogen was 22 MPa, and a weight percentage of the supercritical nitrogen in the polymer melt was 0.5 wt %.

(4) The polymer/gas-mixed polymer melt was injected into a cavity of a die from a nozzle with the help of the injection molding machine screw. An injection rate of the polymer/gas-mixed polymer melt was 100 mm/s. A temperature of the die is in a range of 50 degrees centigrade. The pressure in the die was maintained at 30 MPa. After maintaining the pressure for 4 seconds, a movable side of the die was rapidly opened at a speed of 20 mm/s to start a foaming process. An expansion ratio of the polymer/gas-mixed polymer melt was defined as 5 times. After the foaming process, the product was cooled for 60 seconds, pushed out from the die to obtain a cellulose nanofiber-modified polylactide foam material as shown in FIG. 1.

Figure 2:
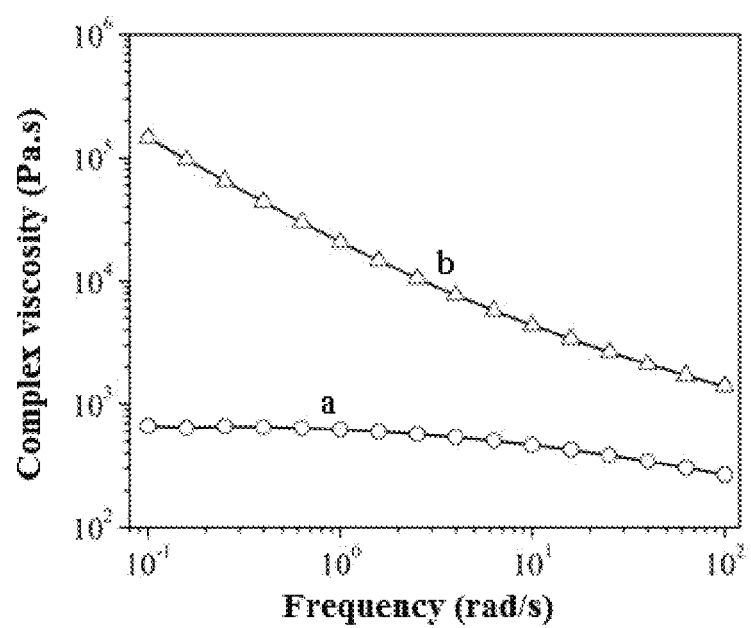
FIG. 2 are a flow curve of a raw material polylactide (PLA) and a flow curve of a polylactide/cellulose nanofiber (PLA/CNF) composite in embodiment 2 of the present disclosure, wherein curve a is the flow curve of the raw material polylactide (PLA), and curve b is the flow curve of the polylactide/cellulose nanofiber (PLA/CNF) composite.

FIG. 2 was a flow curve of a flow curve of a raw material polylactide (PLA) and a flow curve of a polylactide/cellulose nanofiber (PLA/CNF) composite in the present embodiment. It can be concluded from FIG. 2 that adding CNF can greatly improve performances of the PLA melt, so that the PLA/CNF composite had better viscosity and strength.

Embodiment 3

(1) A dry cellulose pulp was added into a mixed liquid of toluene, acetic acid, perchloric acid and acetic anhydride, wherein a volume ratio of toluene, acetic acid, perchloric acid and acetic anhydride was 100:80:0.6:5. A mass percentage of cellulose nanofiber was 20%. The resultant was stirred at room temperature for 3 hours to obtain a modified cellulose nanofiber paste. Then, the modified cellulose nanofiber paste was successively washed with alcohol and deionized water to obtain a surface-modified cellulose nanofiber aqueous solution.

(2) A PLA having a weight-average molecular weight of 150000 was added into a twin-screw extruder via a main feed inlet of the twin-screw extruder, and the surface-modified cellulose nanofiber aqueous solution was added into the twin-screw extruder via an additive feed inlet of the twin-screw extruder. The polylactide and the surface-modified cellulose nanofiber aqueous solution were mixed and melt by a high shearing force of the screw, and extruded firstly to obtain a first extrudate, and vapor was removed from a vent disposed on a charging barrel of the twin-screw extruder. The first extrudate was mixed and melt secondly to obtain a mixture, and the mixture was extruded secondly to obtain a second extrudate. A barrel temperature of mixing and melting the polylactide and the surface-modified cellulose nanofiber was 95 degrees centigrade, screw speed of mixing and melting the polylactide and the surface-modified cellulose nanofiber was 160 rpm. A barrel temperature of melting and mixing the first extrudate was 160 degrees centigrade, and a screw speed of melting and mixing the first extrudate was 200 rpm. The second extrudate was cooled in water, and diced to obtain a polylactide/cellulose nanofiber (PLA/CNF) composite, wherein a mass percentage of the cellulose nanofiber in the polylactide/cellulose nanofiber (PLA/CNF) composite was 10%.

(3) The PLA/CNF composite was disposed in a microporous foaming injection molding machine to plastify and melt the polylactide/cellulose nanofiber composite to obtain a polymer melt. A temperature for melting the PLA/CNF composite was 210 degrees centigrade. A supercritical nitrogen was injected into the microporous foaming injection molding machine with a supercritical fluid equipment, and dispersed and mixed in the polymer melt to obtain a homogeneous polymer/gas-mixed polymer melt. A pressure of the supercritical nitrogen was 24 MPa, and a weight percentage of the supercritical nitrogen in the polymer melt was 0.8 wt %.

(4) The polymer/gas-mixed polymer melt was injected into a cavity of a die from a nozzle with the help of the injection molding machine screw. An injection rate of the polymer/gas-mixed polymer melt was 120 mm/s. A temperature of the die is in a range of 60 degrees centigrade. The pressure in the die was maintained at 40 MPa. After maintaining the pressure for 5.5 seconds, a movable side of the die was rapidly opened at a speed of 30 mm/s to start a foaming process. An expansion ratio of the polymer/gas-mixed polymer melt was defined as 10 times. After the foaming process, the product was cooled for 80 seconds, pushed out from the die to obtain a cellulose nanofiber-modified polylactide foam material.

Embodiment 4

(1) A dry cellulose pulp was added into a mixed liquid of toluene, acetic acid, perchloric acid and acetic anhydride, wherein a volume ratio of toluene, acetic acid, perchloric acid and acetic anhydride was 100:80:1.2:10. A mass percentage of cellulose nanofiber was 40% The resultant was stirred at room temperature for 5 hours to obtain a modified cellulose nanofiber paste. Then, the modified cellulose nanofiber paste was successively washed with alcohol and deionized water to obtain a surface-modified cellulose nanofiber aqueous solution.

(2) A PLA having a weight-average molecular weight of 100000 was added into a twin-screw extruder via a main feed inlet of the twin-screw extruder, and the surface-modified cellulose nanofiber aqueous solution was added into the twin-screw extruder via an additive feed inlet of the twin-screw extruder. The polylactide and the surface-modified cellulose nanofiber aqueous solution were mixed and melt by a high shearing force of the screw, and extruded firstly to obtain a first extrudate, and vapor was removed from a vent disposed on a charging barrel of the twin-screw extruder. The first extrudate was mixed and melt secondly to obtain a mixture, and the mixture was extruded secondly to obtain a second extrudate. A barrel temperature of mixing and melting the polylactide and the surface-modified cellulose nanofiber was 93 degrees centigrade, screw speed of mixing and melting the polylactide and the surface-modified cellulose nanofiber was 200 rpm. A barrel temperature of melting and mixing the first extrudate was 180 degrees centigrade, and a screw speed of melting and mixing the first extrudate was 200 rpm. The second extrudate was cooled in water, and diced to obtain a polylactide/cellulose nanofiber (PLA/CNF) composite, wherein a mass percentage of the cellulose nanofiber in the polylactide/cellulose nanofiber (PLA/CNF) composite was 20%.

(3) The PLA/CNF composite was disposed in a microporous foaming injection molding machine to plastify and melt the polylactide/cellulose nanofiber composite to obtain a polymer melt. A temperature for melting the PLA/CNF composite was 220 degrees centigrade. A supercritical carbon dioxide was injected into the microporous foaming injection molding machine with a supercritical fluid equipment, and dispersed and mixed in the polymer melt to obtain a homogeneous polymer/gas-mixed polymer melt. A pressure of the supercritical nitrogen was 28 MPa, and a weight percentage of the supercritical nitrogen in the polymer melt was 8 wt %.

(4) The polymer/gas-mixed polymer melt was injected into a cavity of a die from a nozzle with the help of the injection molding machine screw. An injection rate of the polymer/gas-mixed polymer melt was 150 mm/s. A temperature of the die is in a range of 70 degrees centigrade. The pressure in the die was maintained at 60 MPa. After maintaining the pressure for 7 seconds, a movable side of the die was rapidly opened at a speed of 20 mm/s to start a foaming process. An expansion ratio of the polymer/gas-mixed polymer melt was defined as 10 times. After the foaming process, the product was cooled for 110 seconds, pushed out from the die to obtain a cellulose nanofiber-modified polylactide foam material.

Embodiment 5

(1) A dry cellulose pulp was added into a mixed liquid of toluene, acetic acid, perchloric acid and acetic anhydride, wherein a volume ratio of toluene, acetic acid, perchloric acid and acetic anhydride was 100:80:0.4:3. A mass percentage of cellulose nanofiber was 10% The resultant was stirred at room temperature for 2 hours to obtain a modified cellulose nanofiber paste. Then, the modified cellulose nanofiber paste was successively washed with alcohol and deionized water to obtain a surface-modified cellulose nanofiber aqueous solution.

(2) A PLA having a weight-average molecular weight of 250000 was added into a twin-screw extruder via a main feed inlet of the twin-screw extruder, and the surface-modified cellulose nanofiber aqueous solution was added into the twin-screw extruder via an additive feed inlet of the twin-screw extruder. The polylactide and the surface-modified cellulose nanofiber aqueous solution were mixed and melt by a high shearing force of the screw, and extruded firstly to obtain a first extrudate, and vapor was removed from a vent disposed on a charging barrel of the twin-screw extruder. The first extrudate was mixed and melt secondly to obtain a mixture, and the mixture was extruded secondly to obtain a second extrudate. A barrel temperature of mixing and melting the polylactide and the surface-modified cellulose nanofiber was 97 degrees centigrade, screw speed of mixing and melting the polylactide and the surface-modified cellulose nanofiber was 130 rpm. A barrel temperature of melting and mixing the first extrudate was 150 degrees centigrade, and a screw speed of melting and mixing the first extrudate was 150 rpm. The second extrudate was cooled in water, and diced to obtain a polylactide/cellulose nanofiber (PLA/CNF) composite, wherein a mass percentage of the cellulose nanofiber in the polylactide/cellulose nanofiber (PLA/CNF) composite was 5%.

(3) The PLA/CNF composite was disposed in a microporous foaming injection molding machine to plastify and melt the polylactide/cellulose nanofiber composite to obtain a polymer melt. A temperature for melting the PLA/CNF composite was 190 degrees centigrade. A supercritical carbon dioxide was injected into the microporous foaming injection molding machine with a supercritical fluid equipment, and dispersed and mixed in the polymer melt to obtain a homogeneous polymer/gas-mixed polymer melt. A pressure of the supercritical nitrogen was 24 MPa, and a weight percentage of the supercritical nitrogen in the polymer melt was 3 wt %.

(4) The polymer/gas-mixed polymer melt was injected into a cavity of a die from a nozzle with the help of the injection molding machine screw. An injection rate of the polymer/gas-mixed polymer melt was 100 mm/s. A temperature of the die is in a range of 50 degrees centigrade. The pressure in the die was maintained at 30 MPa. After maintaining the pressure for 4.5 seconds, a movable side of the die was rapidly opened at a speed of 20 mm/s to start a foaming process. An expansion ratio of the polymer/gas-mixed polymer melt was defined as 2 times. After the foaming process, the product was cooled for 60 seconds, pushed out from the die to obtain a cellulose nanofiber-modified polylactide foam material.

Embodiment 6

(1) A dry cellulose pulp was added into a mixed liquid of toluene, acetic acid, perchloric acid and acetic anhydride, wherein a volume ratio of toluene, acetic acid, perchloric acid and acetic anhydride was 100:80:0.4:3. A mass percentage of cellulose nanofiber was 10% The resultant was stirred at room temperature for 2 hours to obtain a modified cellulose nanofiber paste. Then, the modified cellulose nanofiber paste was successively washed with alcohol and deionized water to obtain a surface-modified cellulose nanofiber aqueous solution.

(2) A PLA having a weight-average molecular weight of 250000 was added into a twin-screw extruder via a main feed inlet of the twin-screw extruder, and the surface-modified cellulose nanofiber aqueous solution was added into the twin-screw extruder via an additive feed inlet of the twin-screw extruder. The polylactide and the surface-modified cellulose nanofiber aqueous solution were mixed and melt by a high shearing force of the screw, and extruded firstly to obtain a first extrudate, and vapor was removed from a vent disposed on a charging barrel of the twin-screw extruder. The first extrudate was mixed and melt secondly to obtain a mixture, and the mixture was extruded secondly to obtain a second extrudate. A barrel temperature of mixing and melting the polylactide and the surface-modified cellulose nanofiber was 97 degrees centigrade, screw speed of mixing and melting the polylactide and the surface-modified cellulose nanofiber was 130 rpm. A barrel temperature of melting and mixing the first extrudate was 150 degrees centigrade, and a screw speed of melting and mixing the first extrudate was 150 rpm. The second extrudate was cooled in water, and diced to obtain a polylactide/cellulose nanofiber (PLA/CNF) composite, wherein a mass percentage of the cellulose nanofiber in the polylactide/cellulose nanofiber (PLA/CNF) composite was 5%.

(3) The PLA/CNF composite was disposed in a microporous foaming injection molding machine to plastify and melt the polylactide/cellulose nanofiber composite to obtain a polymer melt. A temperature for melting the PLA/CNF composite was 190 degrees centigrade. A supercritical carbon dioxide was injected into the microporous foaming injection molding machine with a supercritical fluid equipment, and dispersed and mixed in the polymer melt to obtain a homogeneous polymer/gas-mixed polymer melt. A pressure of the supercritical nitrogen was 26 MPa, and a weight percentage of the supercritical nitrogen in the polymer melt was 5 wt %.

(4) The polymer/gas-mixed polymer melt was injected into a cavity of a die from a nozzle with the help of the injection molding machine screw. An injection rate of the polymer/gas-mixed polymer melt was 100 mm/s. A temperature of the die is in a range of 50 degrees centigrade. The pressure in the die was maintained at 30 MPa. After maintaining the pressure for 4 seconds, a movable side of the die was rapidly opened at a speed of 20 mm/s to start a foaming process. An expansion ratio of the polymer/gas-mixed polymer melt was defined as 12 times. After the foaming process, the product was cooled for 60 seconds, pushed out from the die to obtain a cellulose nanofiber-modified polylactide foam material.

Embodiment 7

(1) A dry cellulose pulp was added into a mixed liquid of toluene, acetic acid, perchloric acid and acetic anhydride, wherein a volume ratio of toluene, acetic acid, perchloric acid and acetic anhydride was 100:80:0.4:3. A mass percentage of cellulose nanofiber was 10% The resultant was stirred at room temperature for 2 hours to obtain a modified cellulose nanofiber paste. Then, the modified cellulose nanofiber paste was successively washed with alcohol and deionized water to obtain a surface-modified cellulose nanofiber aqueous solution.

(2) A PLA having a weight-average molecular weight of 250000 was added into a twin-screw extruder via a main feed inlet of the twin-screw extruder, and the surface-modified cellulose nanofiber aqueous solution was added into the twin-screw extruder via an additive feed inlet of the twin-screw extruder. The polylactide and the surface-modified cellulose nanofiber aqueous solution were mixed and melt by a high shearing force of the screw, and extruded firstly to obtain a first extrudate, and vapor was removed from a vent disposed on a charging barrel of the twin-screw extruder. The first extrudate was mixed and melt secondly to obtain a mixture, and the mixture was extruded secondly to obtain a second extrudate. A barrel temperature of mixing and melting the polylactide and the surface-modified cellulose nanofiber was 97 degrees centigrade, screw speed of mixing and melting the polylactide and the surface-modified cellulose nanofiber was 130 rpm. A barrel temperature of melting and mixing the first extrudate was 150 degrees centigrade, and a screw speed of melting and mixing the first extrudate was 150 rpm. The second extrudate was cooled in water, and diced to obtain a polylactide/cellulose nanofiber (PLA/CNF) composite, wherein a mass percentage of the cellulose nanofiber in the polylactide/cellulose nanofiber (PLA/CNF) composite was 5%.

(3) The PLA/CNF composite was disposed in a microporous foaming injection molding machine to plastify and melt the polylactide/cellulose nanofiber composite to obtain a polymer melt. A temperature for melting the PLA/CNF composite was 190 degrees centigrade. A supercritical carbon dioxide was injected into the microporous foaming injection molding machine with a supercritical fluid equipment, and dispersed and mixed in the polymer melt to obtain a homogeneous polymer/gas-mixed polymer melt. A pressure of the supercritical nitrogen was 28 MPa, and a weight percentage of the supercritical nitrogen in the polymer melt was 8 wt %.

(4) The polymer/gas-mixed polymer melt was injected into a cavity of a die from a nozzle with the help of the injection molding machine screw. An injection rate of the polymer/gas-mixed polymer melt was 100 mm/s. A temperature of the die is in a range of 50 degrees centigrade. The pressure in the die was maintained at 30 MPa. After maintaining the pressure for 3.5 seconds, a movable side of the die was rapidly opened at a speed of 20 mm/s to start a foaming process. An expansion ratio of the polymer/gas-mixed polymer melt was defined as 20 times. After the foaming process, the product was cooled for 60 seconds, pushed out from the die to obtain a cellulose nanofiber-modified polylactide foam material.

Densities and average porous sizes of embodiments 1 to 3 and embodiment 7 of the present disclosure were shown in Table 1.

TABLE 1

| | Embodiment 1 | Embodiment 2 | Embodiment 3 | Embodiment 7 |
|---|---|---|---|---|
| Foam Density (g/cm$^3$) | 0.607 | 0.248 | 0.128 | 0.062 |
| Average porous size (mm) | 8.2 ± 1.4 | 28.9 ± 4.3 | 83.5 ± 8.5 | 115.6 ± 11 |

It can be concluded from Table 1 that densities of the PLA foam materials prepared in the present disclosure can be accurately adjusted in a large scale (0.06 g/cm$^3$ to 0.6 g/cm$^3$), and the PLA foam materials have uniform small porous structure.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. A method for preparing a polylactide foam material by a supercritical fluid injection foaming method, comprising,
    (1) adding dry cellulose pulp into an organic solvent and stirring at room temperature to obtain a modified cellulose nanofiber paste, successively washing the modified cellulose nanofiber paste with alcohol and deionized water to obtain a surface-modified cellulose nanofiber aqueous solution;
    (2) adding a polylactide into a twin-screw extruder via a main feed inlet of the twin-screw extruder, and adding the surface-modified cellulose nanofiber aqueous solution into the twin-screw extruder via an additive feed inlet of the twin-screw extruder, mixing, melting, and extruding the polylactide and the surface-modified cellulose nanofiber firstly, to obtain a first extrudate, while removing vapor via a vent disposed on a charging barrel of the twin-screw extruder,
    melting, mixing, and extruding the first extrudate secondly via the twin-screw extruder to obtain a mixture, extruding the mixture to obtain a second extrudate, cooling the second extrudate in water, and dicing to obtain a polylactide/cellulose nanofiber composite;
    (3) disposing the polylactide/cellulose nanofiber composite in a microporous foaming injection molding machine to plastify and melt the polylactide/cellulose nanofiber composite, and injecting a supercritical foaming agent into the microporous foaming injection molding machine with a supercritical fluid equipment to obtain a homogeneous polymer/gas-mixed polymer melt; and
    (4) injecting the polymer/gas-mixed polymer melt into a cavity of a die, maintaining a pressure in the die, opening the die, and foaming the polymer/gas-mixed polymer melt, and cooling and molding to obtain a polylactide foam material.

2. The method of claim 1, wherein in step (1), the organic solvent is a mixed liquid of toluene, acetic acid, perchloric acid and acetic anhydride, wherein a volume ratio of toluene, acetic acid, perchloric acid and acetic anhydride is 100:80:(0.2-1.2):(1-10), a mass percentage of the cellulose nanofiber in the modified cellulose nanofiber paste is in a range of 5% to 40%, a diameter of the cellulose nanofiber is in a range of 5 nm to 50 nm, a length-diameter ratio of the cellulose nanofiber is in a range of 100 to 1000, and a duration of stirring at room temperature is in a range of 1 hour to 5 hours.

3. The method of claim 1, wherein in step (1), the cellulose is one selected from ramie fiber, flax fiber, sisal fiber, jute fiber, hemp fiber, or bamboo fiber; and in step (2), the polylactide is L-polylactic acid and/or D-polylactic acid, and a weight-average molecular weight of the polylactide is in a range of 100000 to 400000.

4. The method of claim 1, wherein in step (2), a mass percentage of the cellulose nanofiber in the polylactide/cellulose nanofiber composite is in a range of 1% to 20%.

5. The method of claim 1, wherein in step (2), a barrel temperature of mixing and melting the polylactide and the surface-modified cellulose nanofiber is in a range of 93 degrees centigrade to 99 degrees centigrade, and a screw speed of mixing and melting the polylactide and the surface-modified cellulose nanofiber is in a range of 100 rpm to 200 rpm; and a barrel temperature of melting and mixing the first extrudate is in a range of 140 degrees centigrade to 180 degrees centigrade, and a screw speed of melting and mixing the first extrudate is in a range of 100 rpm to 200 rpm.

6. The method of claim 1, wherein in step (3), the supercritical foaming agent is selected from the group consisting of supercritical carbon dioxide, supercritical nitrogen, and any combination thereof.

7. The method of claim 6, wherein the supercritical foaming agent is the supercritical carbon dioxide, and a mass percentage of the supercritical carbon dioxide in the polymer/gas-mixed polymer melt is in a range of 3% to 8%.

8. The method of claim 6, wherein the supercritical foaming agent is the supercritical nitrogen, and a mass percentage of the supercritical nitrogen in the polymer/gas-mixed polymer melt is in a range of 0.2% to 0.8%.

9. The method of claim 1, wherein in step (3), a pressure of the supercritical foaming agent is in a range of 18 MPa to 30 MPa, and a screw temperature of the microporous foaming injection molding machine is in a range of 160 degrees centigrade to 240 degrees centigrade.

10. The method of claim 1, wherein in step (4), an injection rate of the polymer/gas-mixed polymer melt is in a range of 1 mm/s to 300 mm/s, a temperature of the die is in a range of 40 degrees centigrade to 90 degrees centigrade, the pressure in the die is maintained in a range of 5 MPa to 100 MPa, and a duration of maintaining the pressure in the die is in a range of 0.2 seconds to 10 seconds, a speed of opening the die is in a range of 10 mm/s to 30 mm/s, an expansion ratio of the polymer/gas-mixed polymer melt is in a range of 2 times to 20 times, and duration of cooling is in a range of 5 seconds to 300 seconds.

* * * * *